(12) United States Patent
McLoughlin

(10) Patent No.: US 6,363,292 B1
(45) Date of Patent: Mar. 26, 2002

(54) UNIVERSAL TRACK INTERFACE

(75) Inventor: Robert F. McLoughlin, Pelham, NH (US)

(73) Assignee: Mykrolis, Bedford, MA (US)

( * ) Notice: Subject to any disclaimer, the term of this patent is extended or adjusted under 35 U.S.C. 154(b) by 0 days.

(21) Appl. No.: 09/060,454

(22) Filed: Apr. 14, 1998

(51) Int. Cl.⁷ .............................................. G06F 19/00
(52) U.S. Cl. ........................................ 700/121; 700/123
(58) Field of Search .............................. 700/121, 123, 700/25; 710/8; 118/695

(56) References Cited

U.S. PATENT DOCUMENTS 5,788,669 A * 8/1998 Peterson ...................... 604/65
6,101,419 A * 8/2000 Kennedy et al. ............... 700/3
6,183,615 B1 * 2/2001 Yasar et al. ............ 204/298.26
6,191,053 B1 * 2/2001 Chun et al. .................. 438/780

* cited by examiner

Primary Examiner—William Grant
Assistant Examiner—Ryan A. Jarrett
(74) Attorney, Agent, or Firm—Gary Cary Ware & Freidenrich

(57) ABSTRACT

A universal track interface stores a plurality of pre-defined track types for automatically configuring the interface according to the required timing, electrical and hardware configuration for a plurality of different tracks used in semiconductor processing operations. To interface a pump to a track, a predefined track type, comprising interface parameters stored in a track table, is accessed by a microprocessor and used to generate control signals for configuring the interface. An operator input device allows custom interfaces to be defined and stored in the table for use as needed to interface either to non-standard tracks or to vary this track interface according to processing requirements.

21 Claims, 5 Drawing Sheets

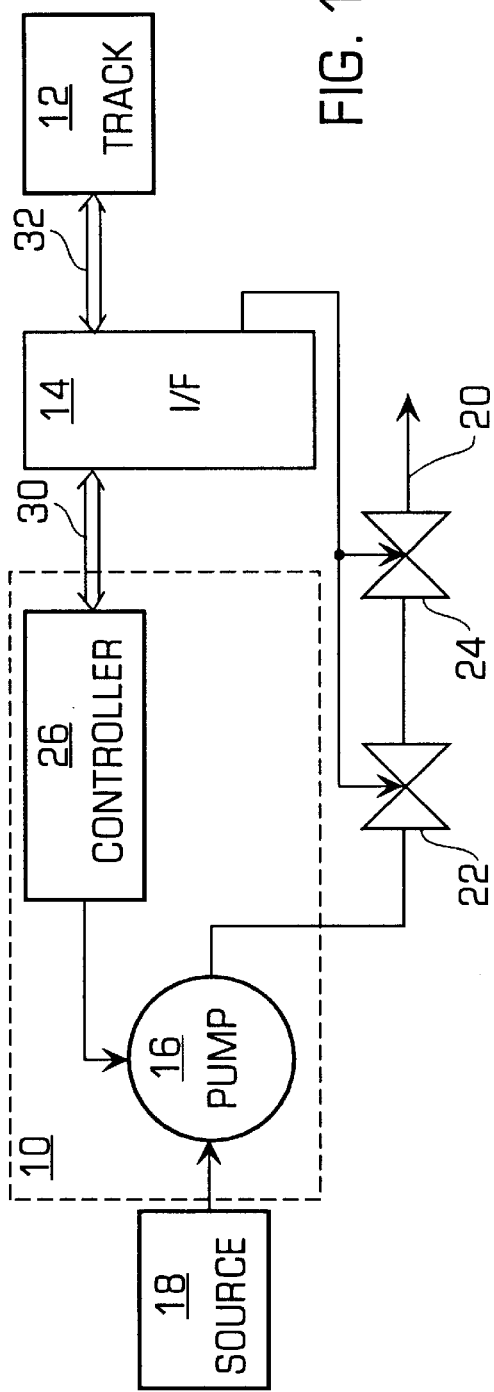
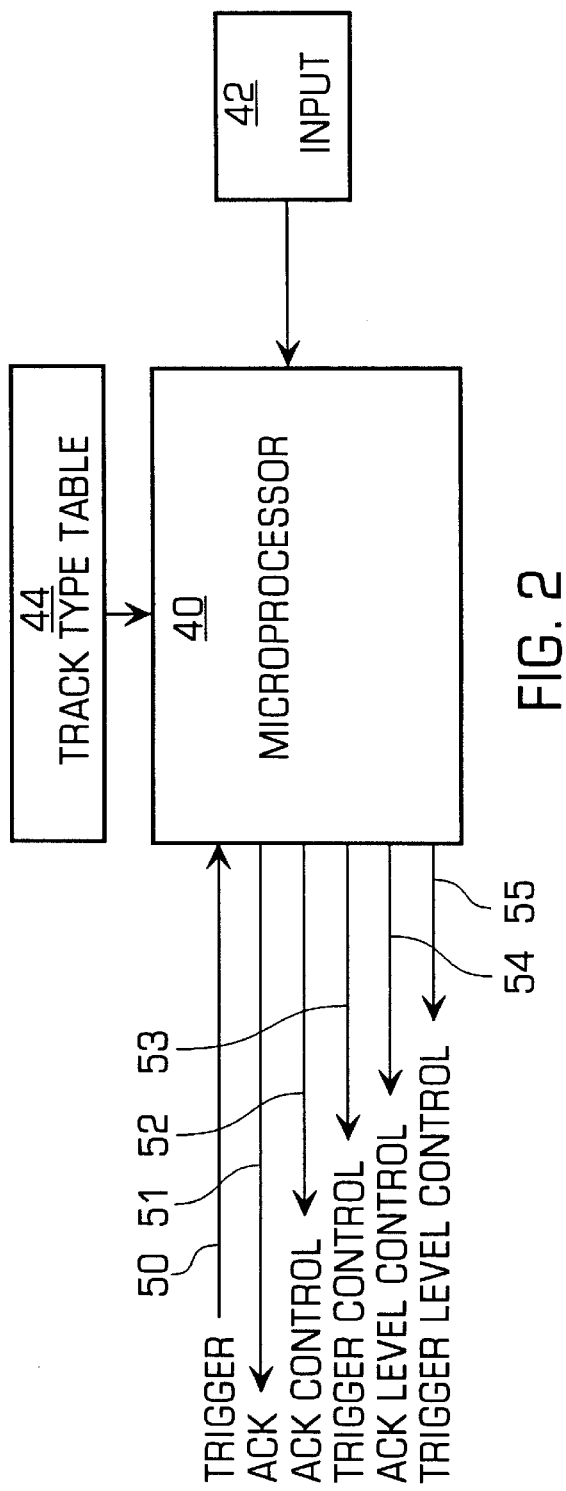

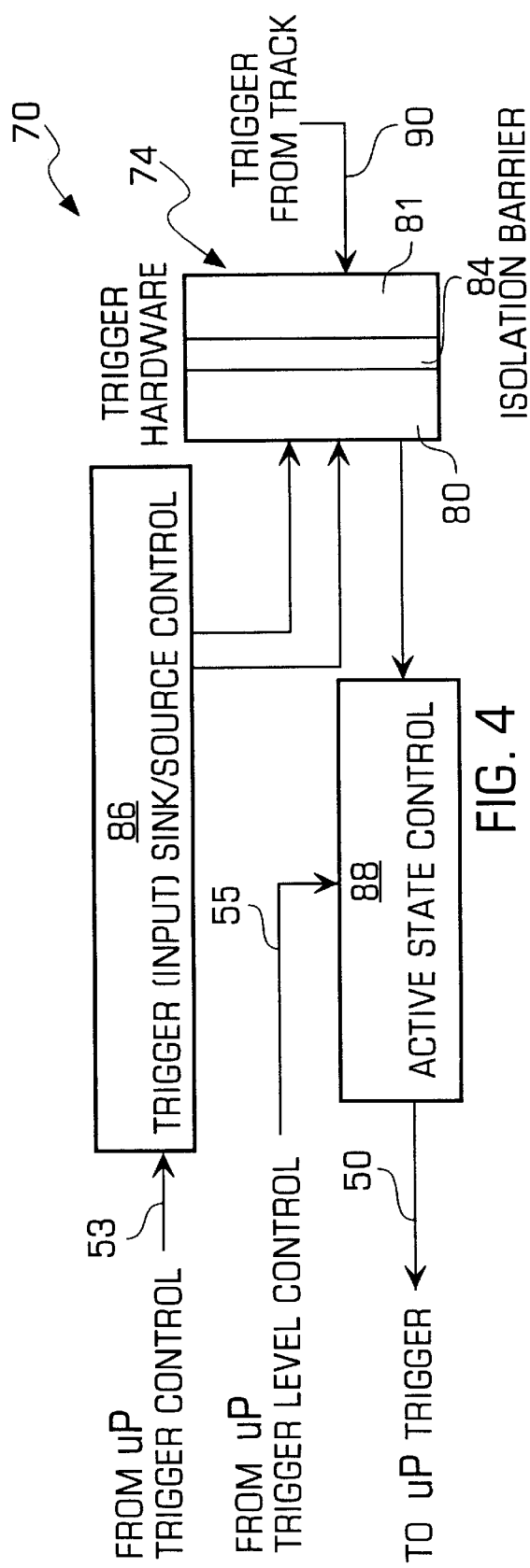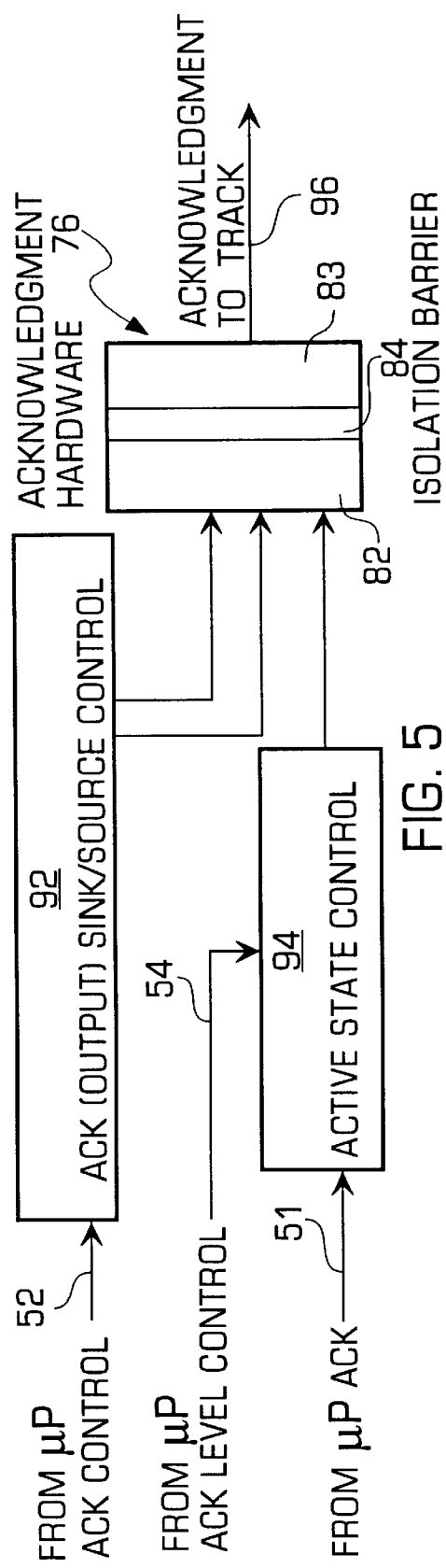

UNIVERSAL TRACK INTERFACE

BACKGROUND OF THE INVENTION

This invention relates generally to pumps of the type used in semiconductor manufacturing operations for dispensing photochemical and other such liquids, and more particularly, to methods and apparatus for interfacing such pumps with track equipment used for wafer handling in such semiconductor processing.

In the manufacture of semiconductor components such as integrated circuits, semiconductor wafers, as of silicon, are subjected to a series of processing operations involving depositing layers of coatings on the wafers, patterning the coatings, etching the coatings to remove material, etc. Each of these processing operations is performed at a different processing station. The wafers are moved between stations and the processing apparatus at each station is controlled by a machine known as a track. The track not only moves wafers between stations, but also controls pumps which dispense photochemicals onto the wafers and controls the start, the stop, and the timing of pumping operations. This requires communications between the pump and the track, which requires that the pump be interfaced to the track. This has traditionally been problematic. Track interfaces involve electrical interfaces, timing interfaces, and hardware interfaces of the inputs and outputs according to the track type and to the pump. There is no standard or universal track interface. Different track manufacturers employ different interfaces, and even different tracks produced by the same manufacturer have different interfaces. Furthermore, the increased sophistication and complexity of tracks necessitate a corresponding increase in sophistication and complexity of the interface. There is also no standard or universal pump interface. Different pumps also have different interfaces.

In the past, a pump-to-track interface setup has been limited by the state and hardware requirements of the interface. Normally, interfacing pumps to tracks required switches and jumpers, and in many cases custom hardware in order to match the unique timing and electrical characteristics of different and perhaps incompatible pumps and tracks. The timing of the signals which are output to the track from a pump may be fixed with respect to a particular pump and depend upon the characteristics and timing of the pump cycle. The signals may or may not be compatible with the track interface, frequently necessitating custom hardware and interfaces.

The multiplicity of different interfaces between different tracks and different pumps has posed problems for process engineers attempting to interface different pumps and tracks, and has inhibited the ability to easily change system hardware. With cleanroom space at a premium and increased demand for semiconductors, the demands on track performance have increased. This has caused track manufacturers to allocate less space for pumps which makes changing of jumpers or switches, or adding of different interface hardware difficult.

It is desirable to provide a way of quickly and easily accommodating the various interface requirements of different tracks and different pumps in a single, easily adapted pump interface without the necessity of extensive hardware changes or custom setups, and it is to these ends that the present invention is directed.

SUMMARY OF THE INVENTION

The invention affords a universal track interface which enables track types comprising the input, output, electrical, hardware, timing, etc. requirements necessary to accommodate different tracks and different pumps to be pre-selected and stored so that a type to accommodate a particular pump and track can be automatically selected and instantiated without the necessity of manually reconfiguring the interface with switches, jumpers or additional hardware to accommodate different interface requirements. The various types may be stored in memory, such as firmware, in the pump, and selected using an appropriate designator, such as a number, to interface the pump to a particular track. Additionally, the track interface may allow a user to customize and store a user-created custom track interface for a particular configuration, either to interface a pump to a track or to change the interface to vary the timing, for example, and other characteristics in order to customize the track interface.

In one aspect, the invention affords an apparatus for interfacing a pump and a track in a semiconductor manufacturing process which includes a memory for storing a plurality of track types which comprise parameters which define the interface requirements for a predetermined track. A control means responsive to the selection of a track type automatically configures the interface hardware in accordance with the parameters of the selected track type in order to interface the track and the pump.

More specifically, the interface comprises optical couplers for electrically isolating control signals between the pump and the track. The interface further includes electrical circuits associated with the pump side of the interface and the track side of the interface, the electrical circuits automatically configuring the interface as a sink for receiving current from the track or as a source for supplying current to the track in accordance with the track type. Additionally, the control signals also select the active state of the control signals between the track and the pump as being either high or low in accordance with track type.

In another aspect, the invention affords apparatus for interfacing a device to a track in a semiconductor manufacturing process, in which the device and the track have a plurality of input and output lines. An electrical circuit having a first portion for the track and a second portion for the device are responsive to configuration signals which define the track interface for configuring the interface according to the track type. The configuration signals enable the interface to be configured as a sink for receiving current from the track or as a source for supplying current to the track in accordance with track type, and select the active state of the control signals as being high or low in accordance with track type.

BRIEF DESCRIPTION OF THE DRAWINGS

FIG. 1 is a block diagram illustrating a pump system interfaced to a track by an interface in accordance with the invention;

FIG. 2 is a block diagram of a portion of the pump system on FIG. 1 illustrating in more detail a microprocessor which controls the system and the interface;

FIG. 4 is a block diagram illustrating a trigger system of a track interface in accordance with the invention;

FIG. 5 is a block diagram illustrating an acknowledgment system of a track interface in accordance with the invention;

DESCRIPTION OF THE PREFERRED EMBODIMENT

Figure 3:
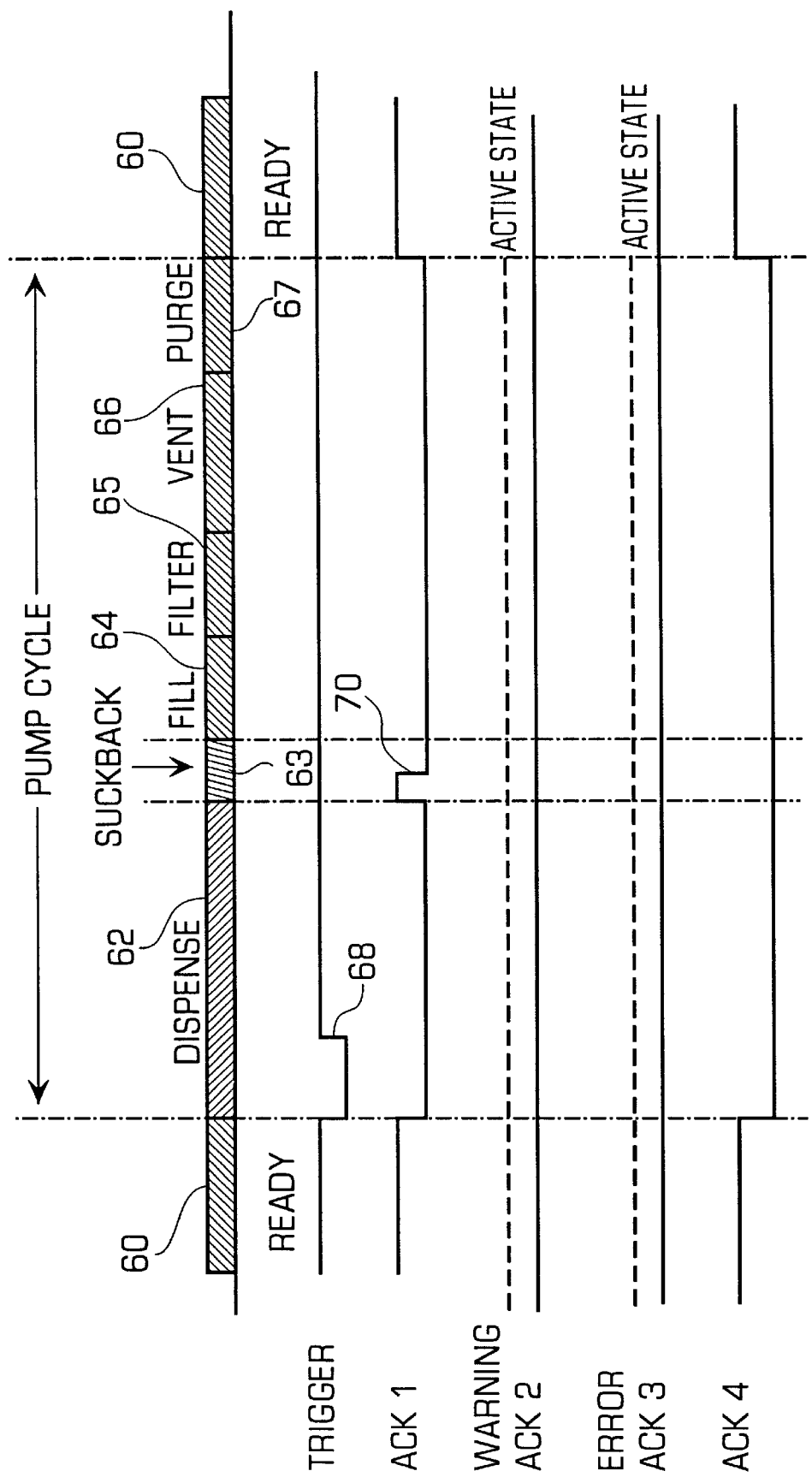
FIG. 3 is a diagrammatic timing view illustrating the operation of a pump system with a track.

The invention is particularly well-adapted for interfacing a pumping system for photochemicals to a track system in a semiconductor processing operation, and will be described in that context. However, as it will become apparent, this is illustrative of only one utility of the invention.

FIG. 1 illustrates a pumping system 10 interfaced to a track 12 by an interface 14 in accordance with the invention. As shown, pumping system 10 comprises a pump 16 which dispenses a liquid, for example, a photochemical such as photoresist, from a source 18 via an output dispense line 20 which may include two valves 22 and 24. The pump and the valves are controlled by a controller 26 of the pump system. The controller also supplies control and status signals to track 12, and receives return control and status signals from the track via interface 14 and a first multi-conductor bus 30 which connects the controller to the interface and a second multi-conductor bus 32 which connects the interface to the track. The controller additionally supplies control signals via bus 30 to control components within interface 14 and to configure the interface appropriately to the track, as will be described in more detail shortly. Generally, the interface 14 functions to ensure compatibility between the pump controller and the track type. Track type refers to the electrical characteristics, timing, hardware configuration and communications protocols and requirements for communicating status and control signals between a pump controller and a track. Track type typically varies between tracks from different manufacturers, as well as between tracks of a single manufacturer. A pump system, hereinafter simply "pump", and a track must communicate control and status information in order to function properly. This requires that the pump and the track signals be compatible electrically, such as in voltage, current and impedance characteristics, and that the hardware characteristics of the interface be compatible. Pumps have a number of lines, typically eight lines, over which they transmit signals to tracks, and tracks have a number of lines, typically three, which communicate with a pump. The meanings of the signals on the various lines have to be taken into account so that the lines and signals are routed appropriately. Additionally, the particular electrical hardware structure that the lines expect to drive must be taken into account. For example, the pump and track lines may be looking for an open collector, e.g., a sink for current, or a follower current signal, i.e., a source of current, and the active state may be either high or lower.

The timing of the signals between the track and the pump are also important and must be considered in the interface. The track type sets the pump up and tells the pump when to begin a dispensing operation. Pumps go through a number of different of states during a pump cycle. The pump has to inform the track of its state, i.e., when it is charged and ready to begin a dispensing operation. It also has to inform the track when it is finished a dispensing operation, and may have to indicate its state at various times or segments during a pump cycle in order for the track to initiate other operations. For example, after dispensing a photochemical onto a semiconductor wafer which is spinning at a relatively low speed to distribute the photochemical evenly across the wafer surface, the wafer spin rate is usually increased in order to spin the excess photochemical off the surface of the wafer. The track needs to know when a dispense operation is completed in order to cause the spin rate to be increased.

In addition to control and status signals, error and warning signals must also be communicated between the pump and the track. Error signals are signals which indicate the presence of a fault that requires operator intervention before pump operation can continue. The track may request, for example, an illegal pump operation which gives rise to an error signal. Warning signals are signals which indicate a condition that requires no immediate operator intervention for operation to continue, but indicates the presence of a condition, as, for example, a maintenance condition, such as the need to replace a filter, that requires operator attendance in order to avoid an error condition arising. The pump must also communicate with control external components, such as suckback valve 22 and shutoff valve 24. Shutoff valve 24 is located near the end of a dispense line 20 for the chemical being dispensed to stop liquid movement. The external suckback valve 22 is a valve that assists in eliminating the formation of a drop at the end of a dispense nozzle. It operates in conjunction with the controller which may, for example, reverse liquid motion by reversing the motor of pump 16 to cause the pump to move liquid back to the source.

FIG. 2 is a block diagram which illustrates in more detail a portion of controller 26 of pump system 10. As shown, the controller may comprise a microprocessor 40 which provides and receives a plurality of various control and status signals via a plurality of lines in bus 30. The microprocessor may also receive an input from an input device 42, such as a keyboard or the like, which allows operator interaction with a pump and a modification of track types and parameters, and from a track type table 44, which may be stored in a nonvolatile memory which stores parameters of the track interface. Table 44 may store a plurality of different track types for a number of different standard tracks, and may store customized track types created by a user. The information stored in the track type table includes the information needed to define the electrical characteristics of the signals on each line, their timing, and the follower or open collector signal type, as well as other hardware configuration information which defines each particular track type. Upon selecting a type, as via input device 42, the information from the track table for the selected type is fed to the microprocessor to automatically configure the pump interface appropriately for the selected track type. This simplifies interfacing the pump system with a track by automatically setting up the correct timing and other interface requirements to ensure compatibility. This allows the pump system to be plugged in, turned on, track type selected, and operation to begin without further operator intervention to interface the pump to the track.

As indicated in FIG. 2, some of the signals provided to and from the microprocessor over bus 30 may include a trigger input on line 50, an acknowledgment ("ack") on line 51, and ack control on a line 52, a trigger control on a line 53, and ack level control on a line 54 and a trigger level control on a line 55.

FIG. 2 does not illustrate all of the input and output lines to the microprocessor, nor does it necessarily represent all of the lines of a particular type to or from the microprocessor. For example, FIG. 2 shows only a single trigger line 50 to the microprocessor. There may be multiple trigger lines, preferably at least two or three, from the track to the microprocessor. The trigger signals are used by track to initiate liquid dispensing by the pump. The track initiates dispensing at the appropriate point during a processing step by trigger signal and, accordingly, sets the timing of the pump dispensing operation. The pump has the ability to store a number of separate recipes, i.e., volumes of liquid which it dispenses. The separate triggers may be employed for selecting different recipes or volumes of liquid according to the requirements of the track. Similarly, FIG. 2 shows only a single line 51 for acknowledgments ("ack") in order to simplify the drawing. In fact, there may be multiple acknowledgment lines, preferably eight, from the pump to the track to indicate pump status, and are used by the track to control various processing operations. This will be explained in more detail shortly with respect to FIG. 3. Each of the trigger and acknowledgment lines may be individually programmed as will be apparent from the description which follows.

As previously described, part of the hardware configuration required as part of the track type definition includes whether the pump supplies current to the track for signaling status or control, i.e., whether the pump is a current source, or whether the pump receives current from the track, i.e., the pump is a current sink. Whether the pump must serve as a source or a sink depends upon the design of the particular track to which the pump is being interfaced, and the hardware configuration the track expects. Another part of the track type definition is whether the signaling is to be high or low when a line is active. With some tracks, a high signal level may indicate a quiescent state, with a negative going or low signal level indicating an active state. With other tracks, signaling may be just the opposite with a high level being the active state and a low level being a quiescent state. Ack control and trigger control lines 52 and 53 from the microprocessor establish the hardware configuration, i.e., whether the line is a sink or a source, of the interface for the acknowledgment and trigger signals, respectively. Lines 54 and 55 configure the interface for active high or active low signaling for the acknowledgment and trigger signals, respectively. This will be described in more detail shortly.

FIG. 3 is a timing diagram which illustrates a typical pump cycle for a given track type, and shows examples of various signaling that may be present between the track and the pump. As shown, a pump cycle may comprise six distinct segments or pump states. These include a ready state 60 at which the pump is charged and ready to dispense liquid; a dispense segment 62 which lasts for a pre-determined period of time during which the pump dispenses liquid. Following the dispense segment, there is a suckback state 63 during which the fluid flow in the dispense line of the pump is reversed to eliminate the formation of a droplet at the end of a dispense nozzle. This may be effected, for example, by reversing the direction of the pump motor for a pre-determined period of time. During this time interval, the pump may control both the shutoff valve 24 and suckback valve 22 in the dispense line 20 to stop and reverse fluid movement through the dispense line. Following suckback, successive pump cycle segments include a fill state 64 during which the pump is recharged with liquid, a filter state 65, a venting state 66, and a purge state 67. Depending upon the particular pump, the constituent segments of the pump cycle, and their timing, may vary.

As shown in FIG. 3, a trigger input (in this case a negative going high-to-low pulse signal 68) may be supplied from the track to the pump to initiate a dispense operation. The pump may respond with an acknowledgment signal (ack 1), also a negative going high-to-low signal, to indicate the initiation of a dispense operation. At the end of the dispense segment, the pump may signal the track with a positive going pulse 70 to indicate entry into the suckback state. As previously described, the pump may, at this time, actuate the external suckback and shutoff valves 22 and 24 to stop liquid flow.

The pulse 70 also serves as a status signal to the track, which the track may use to initiate other operations, e.g., it may increase the spin rate of the wafer to which the pump has dispensed a photochemical processing liquid to remove the excess liquid. Generally, during dispensing, wafers are spun at a relatively low speed in order to evenly dispense the processing liquid over the surface of the wafer. Following dispensing, an ack 1 signal from the pump tells the track to increase the spin speed to a high rate in order to spin off excess photochemicals from the wafer surface. As indicated in FIG. 3, pulse 70 need not have a duration corresponding to the suckback interval. It only needs to function as a signal to the track to indicate the initiation of the suckback state. The signal may then return to a low condition and remain low to the end of the pump cycle.

Another acknowledgment signal, ack 4, may be supplied from the pump to the track to indicate when the pump is charged and ready to begin a dispensing operation. For the assumed hardware signaling condition of low state active, FIG. 3 shows that prior to the trigger 68 initiating a dispense operation, signal ack 4 is high. Upon the pump receiving trigger 68 and entering a dispense state, corresponding to the beginning of a pump cycle, signal ack 4 goes low and remains low throughout the entire pump cycle, which indicates to the track that the pump is not ready for a second dispense cycle until it has proceeded through the successive segments 62–67 of the pump cycle.

FIG. 3 also indicates other acknowledgment signals, such as ack 2 and ack 3, which may be used for warning and error signaling, respectively. As indicated previously, a warning signal is used to indicate a condition which requires attention, but is not serious enough to prevent operation. In contrast, an error signal is one which requires operator intervention and precludes further operation until the error condition is cleared.

FIGS. 4 and 5 are functional block diagrams which illustrate trigger and acknowledgment systems 70 and 72, respectively, in interface 14 of the invention which are controllable by the microprocessor for establishing the hardware configuration (sink or source) and level (high or low) for the trigger and acknowledgment signals, respectively. As shown, each system 70, 72 includes trigger and acknowledgment hardware 74, 76, respectively, each of which includes two portions (80, 81 for trigger hardware 74, and 82, 83 for acknowledgment hardware 76) with the two segments separated by an isolation barrier 84. One portion of the trigger hardware 81 or the acknowledgment hardware 83 is interfaced to the track, and the other portion 80, 82 is interfaced to the microprocessor and to the pump. The isolation barriers 84 isolate the pump and track portions of the hardware electrically, which is convenient for easily interfacing tracks and pumps which employ different voltages and currents, as will be described in more detail shortly.

As shown in FIG. 4, trigger control and trigger level control signals 53 and 55 are supplied from the microprocessor to a trigger input sink/source control unit 86 and to an active state control unit 88, respectively. Control unit 86 supplies signals to the pump portion 80 of trigger hardware 74 to configure the trigger hardware as either a sink or a source for the trigger signals on an input 90 from the track. Similarly, the active state control unit 88 establishes the high or low level as the active level. It also receives the trigger signal from the track, and supplies the trigger signal to the microprocessor via a line 50. As previously indicated, the interface may accept multiple trigger signals, for example, three signals, from the track, in which case system 70 would be replicated for each separate trigger signal.

System 72 of FIG. 5 is somewhat similar to system 70. An ack control signal on line 52 and ack level control signal on line 54 are supplied, respectively, to an ack (output) sink/source control unit 92 and to an active state control unit 94. Control unit 92 supplies acknowledgment signals to the pump portion 82 of the acknowledgment hardware 76 to establish the configuration as sink or source for the hardware. The active state control unit 94 establishes the high or low state as the active state for the hardware. An acknowledgment signal on line 51 from the microprocessor (pump) is appropriately converted and supplied to the track via line 96. As with system 70, acknowledgment system 72 may likewise be replicated for each acknowledgment line (typically eight) from the pump to the track.

Figure 6:
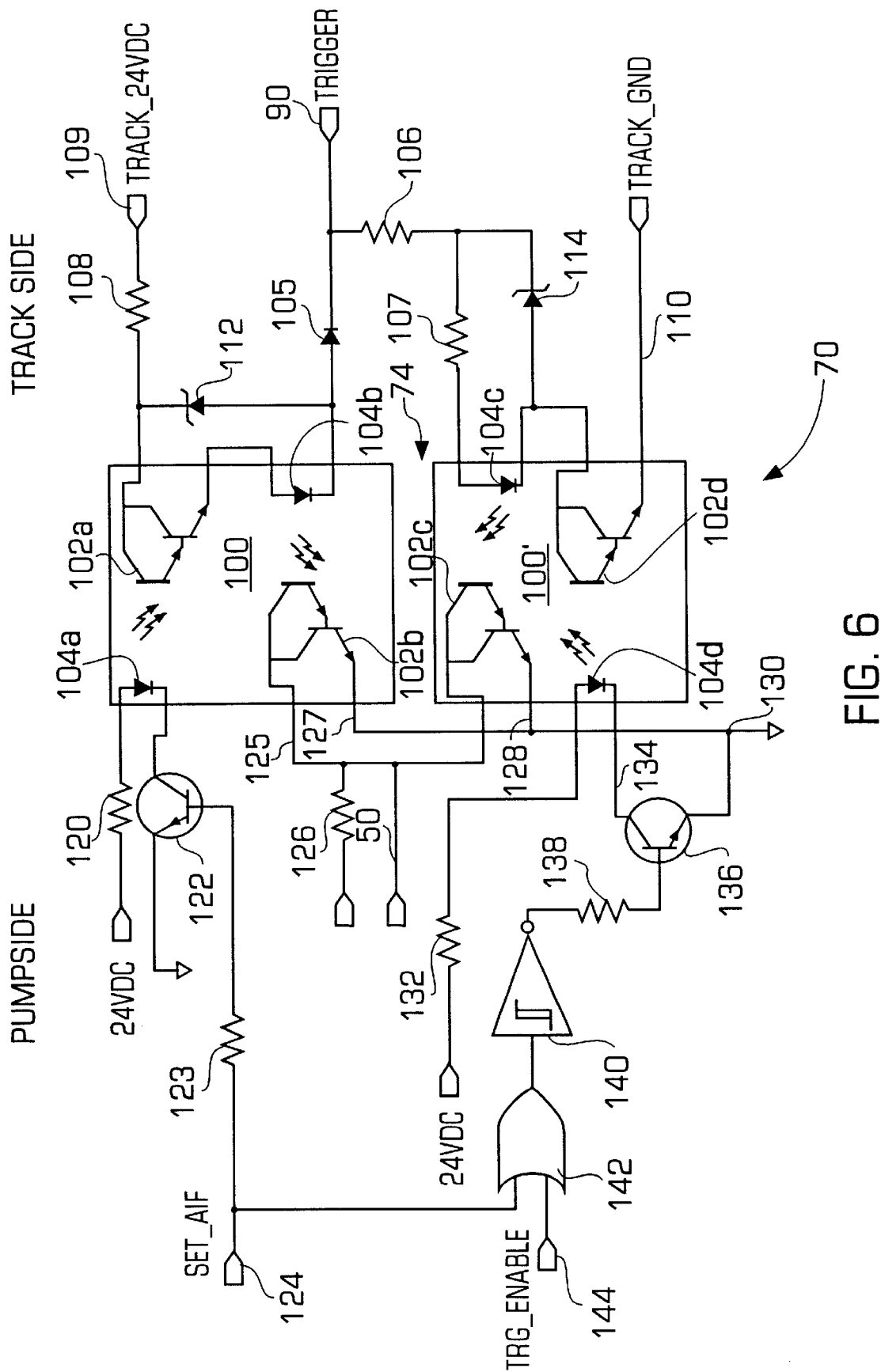
FIG. 6 is a schematic diagram of a preferred embodiment of the trigger system of FIG. 4.
Figure 7:
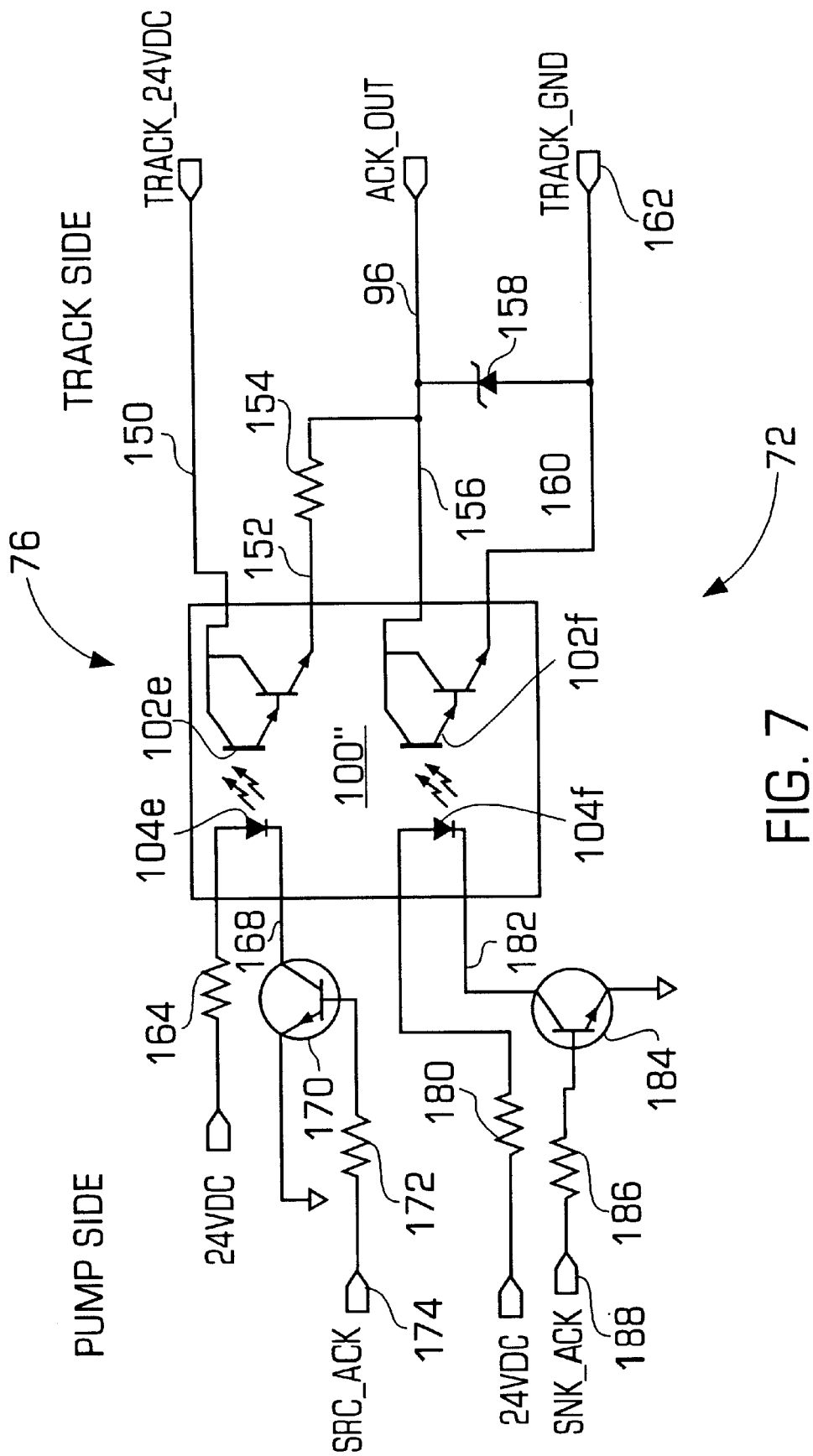
FIG. 7 is a schematic diagram of a preferred embodiment of the acknowledgment system of FIG. 5.

FIGS. 6 and 7 are electrical schematic diagrams which illustrate in more detail preferred embodiments of portions of the trigger system 70 and the acknowledgment system 72, respectively. In particular, FIG. 6 illustrates a preferred implementation of the trigger hardware 74, the trigger sink/source control unit 86 and the active state control unit 88. As shown in FIG. 6, trigger hardware 74 preferably comprises a pair of opto-couplers 100, 100', each of which includes a totem pole arrangement of two sets of cascaded phototransistors 102*a–d*, each set having a corresponding light-emitting diode 104*a–d*. Opto-couplers 100, 100' may be standard commercially available devices, such as a type ILD223TA1 opto-coupler. When a light-emitting diode 104*a–d* is energized by a current to emit light, it turns on its corresponding transistor 102 to begin conducting. In effect, each light-emitting diode and transistor corresponds to an optical switch with the input and output of the switch isolated. This may constitute the isolation barrier (84 of FIG. 4) between the input and output, which isolates the pump/interface from the track. This is convenient for enabling the pump to be interfaced to tracks having different voltage and current requirements, as well as for minimizing the possibility of electrical interference due to ground loops or other common mode effects. While it is preferable to electrically isolate the two portions of the trigger hardware (and the acknowledgment hardware as described below) using optical coupling, other isolating means such as transformers and switched capacitors may also be used for isolation.

As shown, on the track side, a trigger input line 90 (from the track) is supplied through a diode 105 to the lower light-emitting diode 104*b* of the top opto-coupler 100, and tied through resistors 106 and 107 to the top light-emitting diode 104*c* of the lower opto-coupler 100'. The top phototransistor 102*a* of the upper opto-coupler 100 has its collector connected through a resistor 108 to an input line 109 connected to the track voltage, such as 24 VDC. Similarly, the bottom phototransistor 102*d* of the lower optical coupler 100' has its emitter 110 connected to track ground (TRACK_GND) on the track side. A first Zener diode 112, preferably having a breakdown voltage greater the track voltage, e.g., 27V is connected across the top phototransistor 102*a* and bottom light-emitting diode 104*b* of the upper opto-coupler 100, i.e., from the collector of the transistor to the junction of the light-emitting diode and diode 105. A second Zener diode 114, preferably having a breakdown voltage lower than the track voltage, e.g., 10V, may be connected between the junction of resistors 106 and 107 and the junction of top light-emitting diode 104*c* and bottom phototransistor 102*d* of the lower opto-coupler 100'.

On the pump side of the interface circuit 70 of FIG. 6, the top pump-side light-emitting diode 104*a* of the upper opto-coupler 100 is connected to a voltage source, such as 24 VDC, through a resistor 120, and has its cathode connected to the collector of a grounded emitter transistor 122. The base of the transistor is connected through a resistor 123 to an input signal control line 124 (SET_AIF). The bottom phototransistor 102*b* of the upper opto-coupler 100 has its collector 125 connected in parallel with the collector of the top phototransistor 102*c* of the lower opto-coupler 100'. The collectors are tied through a resistor 126 to a voltage source (5 VDC) and through an output trigger line 50. The emitter 127 of the bottom phototransistor 102*b* of the upper opto-coupler 100 and the emitter 128 of the top phototransistor 102*c* of the lower opto-coupler 100' are likewise tied together in parallel and to a circuit ground 130. The bottom light-emitting diode 104*d* of the lower opto-coupler may also be connected through a resistor 132 to a voltage source (24 VDC), and have its cathode 134 connected to the collector of the grounded emitter transistor 136. The base of transistor 136 may be connected through a resistor 138 to the output of an inverting Schmidt trigger 140, the input of which is driven by the output of an OR gate 142. One input of OR gate 142 may be connected to signal line (SET_AIF) 124, and a second input may be connected to a trigger enable line (TNG_ENABLE) 144, as shown.

The trigger interface system of FIG. 6 interfaces the trigger output from the track on line 90 to the trigger input of the microprocessor on line 50. Depending upon the track type, the track may expect to receive current on line 90 from a source, or may expect to supply current on line 90 to a sink, as previously described. If the track expects to receive current from a source, the top phototransistor 102*a* of the upper opto-coupler operates as an emitter-follower to drive current through diode 105 to trigger line 90 when the trigger line is low.

In order to set up the upper opto-coupler 100 to operate as a current source, the top phototransistor 102*a* of the upper opto-coupler 100 must be energized to be in a conducting state. This is accomplished by supplying a high control signal from the pump side on line 124 to turn on transistor 122. This causes the transistor 122 to conduct and current to flow through the top light-emitting diode 104*a*. Current flowing through the diode causes the diode to emit light, which places the top phototransistor 102*a* in a conductive state to conduct when a low trigger signal appears on line 90. Upon the occurrence of a trigger on line 90, current flows through the bottom light-emitting diode 104*b* of the upper opto-coupler, which turns on the bottom grounded emitter phototransistor 102*b*, producing a low-going trigger signal on line 50. Thus, for this arrangement, the active state of the trigger is low.

Alternatively, if the active state of the trigger from the track is high, and the trigger is connected to a source, normally in a quiescent state current would be flowing through the bottom light-emitting diode 104*b* of the upper opto-coupler to line 90, and the trigger line 50 to the microprocessor/pump would be low. When the trigger from the track on line 90 goes active, i.e., high, it turns off the bottom light-emitting diode, which turns off the bottom phototransistor 102*b*, and causes the trigger line 50 to go high.

If the track, on the other hand, expects to drive current into a sink, the lower opto-coupler 100' is used in an open collector configuration. In this case, the trigger line 90 is connected through resistors 106 and 107 and the top light-emitting diode 104*c* of the lower opto-coupler to the collector of the bottom phototransistor 102*d'* on the track side. The emitter 110 of the bottom phototransistor is grounded to the track (TRACK_GND). To operate the lower opto-coupler 100' in an open collector configuration, the bottom phototransistor 102d must be in a conducting state. This requires that current be flowing through the bottom light-emitting diode 104d on the pump side. This, in turn, requires that grounded-emitter transistor 136 be conducting. This is accomplished by driving the base of transistor 136 high with the output of inverting Schmidt trigger 140. When transistor 136 turns on, the bottom light-emitting diode 104d on the pump side emits light to turn on the bottom phototransistor 102d on the track side of the lower opto-coupler. If the trigger signal on line 90 is high, current will flow through the top light-emitting diode 104c and the conducting bottom phototransistor 102d, causing the top grounded emitter phototransistor 102c on the pump side of the lower opto-coupler to conduct. This will cause the trigger signal on line 50 to go low. If, on the other hand, transistor 136 is not conducting, the bottom phototransistor 102d on the track side of the lower opto-coupler will be off so no current will flow through the top light-emitting diode 104c on the track side and, consequently, the top phototransistor 102c on the pump side would be off. Therefore, the trigger line 50 would be high.

In order to cause the top phototransistor 102c on the pump side to conduct and cause the trigger line 50 to go low, transistor 136 has to be triggered to a conducting state. This may be accomplished by a low signal on line 124, which turns off transistor 122, and turns on transistor 136 after being inverted by Schmidt trigger 140. Normally the TRG_ENABLE input 144 to OR gate 142 is low, except during power up when it assists in disabling the trigger circuit until power up is completed. Thus, when the trigger signal on line 90 is in a high quiescent state, the trigger signal on line 50 will be low, as long as the trigger enable signal on line 144 causes transistor 136 to conduct. If the trigger signal on line 90 then goes low, current will cease flowing through the top light-emitting diode 104c on the track side of the lower opto-coupler, turning off the top phototransistor 102c, and allowing the trigger line to go high.

In the foregoing, it can be seen that the trigger circuit of FIG. 6 can accommodate tracks which require either a source or a sink for current, as well as active states which are either high or low.

FIG. 7 illustrates a preferred embodiment for implementing a portion of the acknowledgment system 72 of FIG. 5. As shown, the acknowledgment hardware 76 may comprise a totem pole opto-coupler 100" which may be of the same type of opto-coupler employed in the trigger circuit of FIG. 6. As shown, the opto-coupler comprises a top complimentary connected phototransistor 102e and corresponding light-emitting diode 104e and a bottom complimentary connected phototransistor 102f and corresponding light-emitting diode 104f. The elements of the opto-coupler 100" of FIG. 7 are connected differently, however, from those of FIG. 6 in that both the top and bottom phototransistors are connected to the track side of the circuit, and both of the light-emitting diodes are connected to the pump side. The collector 150 of the top phototransistor may be connected to a track voltage source, such as 24 VDC, and the emitter 152 may be connected through a resistor 154 to the collector 156 of the bottom phototransistor and also connected to the acknowledgment signal (ACK_OUT) line 96 to the track. The signal line 96 may also be connected to a Zener diode 158, which may have a breakdown voltage greater than the track voltage, e.g., 27 VDC. The emitter 160 of the bottom phototransistor is connected also to track ground at 162 (TRACK_GND), as shown.

On the pump side, the top light-emitting diode 104e is connected through a resistor 164 to a voltage source, such as 24 VDC, and to the collector 168 of a grounded emitter transistor 170. The base of transistor 170 is connected through a resistor 172 to a source acknowledgment signal (SRC_ACK) 174. The bottom light-emitting diode 104f is similarly connected to a 24 VDC voltage source through a resistor 180 and to the collector 182 of another grounded emitter transistor 184. The base of transistor 184 may similarly be connected through a resistor 186 to a sink acknowledgment input (SNK_ACK) 188.

Similar to the trigger circuit of FIG. 6, when the track expects to receive current from a source, the top phototransistor 102e is used in a follower configuration to supply current to the acknowledgment line (ACK_OUT) 96 to the track. Alternatively, when the track expects to deliver current to a sink, the lower phototransistor 102f is used as an open collector transistor to receive current from the track.

To operate in a source configuration, a signal is applied to the source acknowledgment line 174, causing transistor 170 to conduct. This causes current to flow through the top light-emitting diode 104e to place the top phototransistor 102e in a conducting state, which drives current through line 96 to the track to provide an acknowledgment signal. Alternatively, to configure a circuit as a sink, a signal is applied to the sink acknowledgment input 188 to cause transistor 184 to conduct. This causes current to flow through the bottom light-emitting diode 104f to place the bottom phototransistor 102f in a conducting state, allowing current to flow from the track on signal line 96 through the bottom phototransistor to ground.

To set the active state either high or low, the microprocessor simply controls the source acknowledgment signal and sink acknowledgment signal to cause the signals to go either high or low depending upon whether the acknowledgment signal on line 96 is to be high or low.

As will be appreciated from the foregoing, by appropriately controlling the trigger and the acknowledgment circuits, the interface can be easily configured under microprocessor control to function as either a source or a sink, and to set the active state as either high or low. As previously indicated, each trigger and acknowledgment line would have a separate trigger or acknowledgment circuit. Furthermore, the hardware configuration and active state condition timings associated with each of the lines can be separately controlled by the microprocessor according to a particular type definition. By storing track type in a track type table 44 (see FIG. 2), the configuration of the pump interface can be quickly and easily changed to accommodate a plurality of different track types which are pre-defined and pre-stored in the table. To interface the pump with a particular track, it is only necessary to input to the pump (microprocessor) an indicator for the desired track type, and the appropriate parameters will be automatically loaded by the microprocessor to the interface. Additionally, the input device 42 may be used by an operator to customize the track type for a particular application, and the customized type stored in the table.

As will be appreciated from the foregoing, the invention affords a universal interface which affords flexibility and versatility to enable a plurality of different pumps and tracks to be interfaced quickly and easily by automatically configuring the interface according to a pre-defined track type definition.

While the foregoing has been with reference to a particular embodiment of the invention, it will be appreciated by those skilled in the art that changes to this embodiment may be made without departing from the principles and the spirit of the invention, the scope of which is defined in the appended claims.

What is claimed:

1. Apparatus for interfacing a track and a pump in a semiconductor manufacturing process comprising a memory for storing a plurality of track types, each type defining parameters for interfacing to a predetermined track; means for selecting from said memory a track type; interfacing hardware for interfacing the track and the pump; and control means responsive to the selected track type for automatically configuring interface hardware in accordance with the parameters of the selected track type to interface the pump and the track.

2. The apparatus of claim 1, wherein said interface hardware comprises electrical circuits having first and second portions, the first and second portions being electrically isolated from one another.

3. The apparatus of claim 2, wherein said electrical circuits comprise an optical coupling between said first and second portions for isolating said first and second portions.

4. The apparatus of claim 3, wherein said optical coupling comprises light-emitting diodes and phototransistors, a phototransistor being rendered conductive by light from a corresponding light-emitting diode.

5. The apparatus of claim 2, wherein there are a plurality of signal lines between the pump and the track, each signal line having separate interface hardware, and wherein the control means configures the interface hardware for the signal lines in accordance with the track type parameters.

6. The apparatus of claim 5, wherein the signal lines comprise trigger lines from the track to the pump for initiating pump operations, and acknowledgment lines from the pump to the track to indicate pump status.

7. The apparatus of claim 2, wherein the control means comprises means for configuring the interface hardware in response to track type parameters such that the hardware is one of a sink to receive current from the track or a source to supply current to the track.

8. The apparatus of claim 7, wherein the configuring means configures the electrical circuits of the first portion of the interface hardware as an open collector when configured as a sink and as an emitter follower when configured as a source.

9. The apparatus of claim 8, wherein the configuring means further includes means for configuring the electrical circuits of the interface hardware in accordance with the track type parameters to have an active state which is either high or low as defined by the parameters.

10. The apparatus of claim 1, wherein said control means comprises a microprocessor, and said memory for storing a plurality of track types comprises a non-volatile memory for storing said track types, each track type having a designator, and the means for selecting a track type comprises means for inputting to the microprocessor the designator corresponding to the selected track type.

11. Apparatus for interfacing a device to a track in a semiconductor manufacturing process, the device and the track having a plurality of corresponding input and output lines for control and status signals, the apparatus comprising an electrical circuit having a first portion interfaced to the track and having a second portion interfaced to the device: first means responsive to configuration signals defining a track interface for configuring the first portion as one of a sink for receiving current from the track or a source for supplying current to the track; and second means responsive to the configuration signals for configuring the first portion so that the active state of said control signals is either high or low according to the definition of the track interface.

12. The apparatus of claim 11, wherein said first and second portions are electrically isolated and optically coupled.

13. The apparatus of claim 12 further comprising an opto-coupler comprising light-emitting diodes and corresponding phototransistors for optically coupling the track to said device, the electrical circuit comprising means for driving current through selected light-emitting diodes to place the corresponding phototransistors in a conductive state.

14. The apparatus of claim 11 further comprising a memory for storing track types comprising parameters defining the characteristics of the control signals to the track, and wherein the first and second configuring means comprises a controller for generating said configuration signals in response to the track type.

15. The apparatus of claim 14, wherein said controller comprises a microprocessor for generating configuration signals and for adjusting the timing of said configuration signals according to said track type.

16. The apparatus of claim 15, wherein said device comprises a pump controlled by said microprocessor, and said configuration signals comprise a trigger signal from the track to initiate a dispense from the pump, and acknowledgment signals from the pump to the track to indicate to the track pump status.

17. The apparatus of claim 16, wherein said pump supplies liquid to the track via a dispense line having valve means for preventing the flow of liquid through the line, and wherein the microprocessor issues control signals to the valve means at the conclusion of a dispense operation to prevent the flow of liquid through the line.

18. The apparatus of claim 17, wherein the microprocessor further includes means for reversing the pump at the conclusion of a dispense operation in order to suckback liquid into the dispense line.

19. The apparatus of claim 18, wherein the microprocessor generates an acknowledgment signal upon the conclusion of a dispense operation which is used by the track to control semiconductor processing.

20. Apparatus for interfacing a pump and a track in a semiconductor manufacturing process, the apparatus comprising a controller for controlling the pump operation; an interface for interfacing a controller to the track, the interface receiving a plurality of trigger signals from the track and conveying the trigger signals to the controller, and for receiving a plurality of acknowledgment signals from the pump and for conveying the acknowledgment signals to the track; the controller having means for configuring the interface as one of a sink for receiving current from the track or a source for supplying current to the track in accordance with a set of parameters for defining the track type, and the controller having means for establishing the active state of trigger and acknowledgment signals between the interface and the track as having a high or a low level in accordance with said track type.

21. The apparatus of claim 20, wherein said interface comprises opto-couplers for electrically isolating the controller from the track, the acknowledgment and trigger signals activating optical elements within the opto-coupler and for communicating with corresponding optical elements on the controller side.

* * * * *